United States Patent
Kawabe (10) Patent No.: US 11,642,958 B2
(45) Date of Patent: May 9, 2023

(54) HEAT EXCHANGE SYSTEM, METHOD, NON-TRANSITORY STORAGE MEDIUM, AND VEHICLE

(71) Applicant: TOYOTA JIDOSHA KABUSHIKI KAISHA, Toyota (JP)

(72) Inventor: Takayuki Kawabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/839,569

(22) Filed: Jun. 14, 2022

(65) Prior Publication Data

US 2022/0305903 A1    Sep. 29, 2022

Related U.S. Application Data

(63) Continuation of application No. 17/153,973, filed on Jan. 21, 2021, now Pat. No. 11,396,228.

(30) Foreign Application Priority Data

Mar. 2, 2020    (JP) .............................. JP2020-035020

(51) Int. Cl.
*B60K 11/02* (2006.01)
*B60L 1/00* (2006.01)

(52) U.S. Cl.
CPC .............. *B60K 11/02* (2013.01); *B60L 1/003* (2013.01); *B60L 2240/36* (2013.01)

(58) Field of Classification Search
CPC ....... B60K 11/02; B60L 1/003; B60L 2240/36
See application file for complete search history.

(56) References Cited

U.S. PATENT DOCUMENTS

2010/0294217 A1    11/2010    Kasuya et al.
2015/0101789 A1*    4/2015    Enomoto ............... B60H 1/039
                                                                          236/35

FOREIGN PATENT DOCUMENTS

JP        2009-167994 A    7/2009
JP        2014-080123 A    5/2014

* cited by examiner

*Primary Examiner* — Jacob M Amick
*Assistant Examiner* — Charles J Brauch
(74) *Attorney, Agent, or Firm* — Oliff PLC (57) ABSTRACT

A heat exchange system includes a first thermal circuit, a second thermal circuit, and a controller. A first thermal circuit includes a first device, a first pump, and a first flow path and a second flow path configured to cool the first device. A second thermal circuit includes a second device, a second pump, and a third flow path and a fourth flow path configured to cool the second device. A controller is configured to switch, when the controller switches a flow path of the first thermal circuit from the first flow path to the second flow path and switches a flow path of the second thermal circuit from the fourth flow path to the third flow path, the fourth flow path to the third flow path and the first flow path to the second flow path.

6 Claims, 7 Drawing Sheets

HEAT EXCHANGE SYSTEM, METHOD, NON-TRANSITORY STORAGE MEDIUM, AND VEHICLE

CROSS-REFERENCE TO RELATED APPLICATION

This application is a continuation of U.S. Ser. No. 17/153,973, filed Jan. 21, 2021, the contents of which are incorporated herein by reference. This application claims priority to Japanese Patent Application No. 2020-035020 filed on Mar. 2, 2020, incorporated herein by reference in its entirety.

BACKGROUND

1. Technical Field

The present disclosure relates to a heat exchange system that executes heat exchange of a device mounted on a vehicle, a method, a non-transitory storage medium, and a vehicle.

2. Description of Related Art

Japanese Unexamined Patent Application Publication No. 2014-080123 (JP 2014-080123 A) discloses a vehicle heat management system that suppresses, when switching a flow path for circulating coolant (heat medium) to a heat medium distribution device (e.g. a battery, an electric motor, a chiller, a water cooling condenser), a fluctuation of the coolant temperature before and after the switching of the circulation flow path.

In the system disclosed in JP 2014-080123 A, when a circulation flow path of the heat medium distribution device is switched from a first flow path to a second flow path, a valve that switches a pump that pumps the coolant and the circulation flow path is appropriately controlled so as to suppress mixing of the coolant flowing through the first flow path and the coolant flowing through the second flow path in the flow path.

SUMMARY

In the vehicle heat management system disclosed in JP 2014-080123 A, the circulation flow path is switched after a state where the coolant in the first flow path and the coolant in the second flow path temporarily merge into each other in the circulation flow path. Accordingly, in a state where the first flow path and the second flow path are in communication with each other, which occurs during the switching of the circulation flow path, circulation of the coolant in the flow path may be stopped, or the coolant in the flow path may flow in a reverse direction, due to a change in a flow path length and a difference in directions in which the coolant flows. The changes in the coolant flow as described above may result in insufficient cooling of the heat medium distribution device.

The present disclosure provides a heat exchange system that can suppress that circulation of the coolant in the flow path is stopped or the coolant in the flow path flows in the reverse direction when switching the circulation flow path.

A first aspect of the present disclosure is a heat exchange system including a first thermal circuit, a second thermal circuit, and a controller. The first thermal circuit includes a first device, a first pump, a first flow path configured to circulate a first coolant pumped by the first pump and cool the first device, and a second flow path configured to circulate the first coolant via a common flow path that is shared by a plurality of thermal circuits and cool the first device. The second thermal circuit includes a second device, a second pump, a third flow path configured to circulate a second coolant pumped by the second pump and cool the second device, and a fourth flow path configured to circulate the second coolant via the common flow path and cool the second device. The controller is configured to switch, when the controller switches a flow path of the first thermal circuit from the first flow path to the second flow path and switches a flow path of the second thermal circuit from the fourth flow path to the third flow path, the fourth flow path to the third flow path and the first flow path to the second flow path.

In the first aspect above, the second flow path may be set longer than the first flow path in the first thermal circuit, and the controller may be configured to, before switching the flow path of the first thermal circuit from the first flow path to the second flow path, issue a command to increase an amount of the first coolant pumped by the first pump to the first flow path.

In the first aspect above, the fourth flow path may be set longer than the third flow path in the second thermal circuit, and the controller may be configured to, after switching the flow path of the second thermal circuit from the fourth flow path to the third flow path, issue a command to decrease an amount of the second coolant pumped by the second pump to the third flow path.

A second aspect of the present disclosure is a flow path switching control method executed by a computer of a heat exchange system. The heat exchange system includes a first thermal circuit having a first device, a first pump, a first flow path configured to circulate a first coolant pumped by the first pump and cool the first device, and a second flow path configured to circulate the first coolant via a common flow path that is shared by a plurality of thermal circuits and cool the first device and a second thermal circuit including a second device, a second pump, a third flow path configured to circulate a second coolant pumped by the second pump and cool the second device, and a fourth flow path configured to circulate the second coolant via the common flow path and cool the second device. The control method includes switching, when a flow path of the first thermal circuit is switched from the first flow path to the second flow path and a flow path of the second thermal circuit is switched from the fourth flow path to the third flow path, the fourth flow path to the third flow path and the first flow path to the second flow path.

A third aspect of the present disclosure is a non-transitory storage medium storing instructions that are executable by one or more processors in a computer of a heat exchange system including a first thermal circuit having a first device, a first pump, a first flow path configured to circulate a first coolant pumped by the first pump and cool the first device, and a second flow path configured to circulate the first coolant via a common flow path that is shared by a plurality of thermal circuits and cool the first device and a second thermal circuit including a second device, a second pump, a third flow path configured to circulate a second coolant pumped by the second pump and cool the second device, and a fourth flow path configured to circulate the second coolant via the common flow path and cool the second device, and that cause the one or more processors to perform functions. The functions include switching, when a flow path of the first thermal circuit is switched from the first flow path to the second flow path and a flow path of the second thermal circuit is switched from the fourth flow path to the third flow path, the fourth flow path to the third flow path and the first flow path to the second flow path.

A fourth aspect of the present disclosure is a vehicle including a heat exchange system. The heat exchange system includes a first thermal circuit, a second thermal circuit, and a controller. The first thermal circuit includes a first device, a first pump, a first flow path configured to circulate a first coolant pumped by the first pump and cool the first device, and a second flow path configured to circulate the first coolant via a common flow path that is shared by a plurality of thermal circuits and cool the first device. The second thermal circuit includes a second device, a second pump, a third flow path configured to circulate a second coolant pumped by the second pump and cool the second device, and a fourth flow path configured to circulate the second coolant via the common flow path and cool the second device. The controller is configured to switch, when the controller switches a flow path of the first thermal circuit from the first flow path to the second flow path and switches a flow path of the second thermal circuit from the fourth flow path to the third flow path, the fourth flow path to the third flow path and the first flow path to the second flow path.

In the fourth aspect, the second flow path may be set longer than the first flow path in the first thermal circuit, and the controller is configured to, before switching the flow path of the first thermal circuit from the first flow path to the second flow path, issue a command to increase an amount of the first coolant pumped by the first pump to the first flow path.

In the fourth aspect, the fourth flow path may be set longer than the third flow path in the second thermal circuit, and the controller may be configured to, after switching the flow path of the second thermal circuit from the fourth flow path to the third flow path, issue a command to decrease an amount of the second coolant pumped by the second pump to the third flow path.

According to the first aspect, the second aspect, the third aspect, and the fourth aspect of the present disclosure, the circulation flow path is switched such that the coolant in the first flow path does not temporarily merge into the coolant in the second flow path in the flow path. Therefore, stop of the circulation of the coolant in the flow path and reverse flow of the coolant in the flow path can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A heat exchange system according to the present disclosure executes a cooperative control, in a plurality of thermal circuits having a common flow path as a part of a flow path for circulating coolant, by switching the flow path of each thermal circuit and adjusting an amount of the coolant in the flow path so as to suppress stop of the circulation of the coolant in the flow path and a reverse flow of the coolant in the flow path.

Embodiment

Configuration

Figure 1:
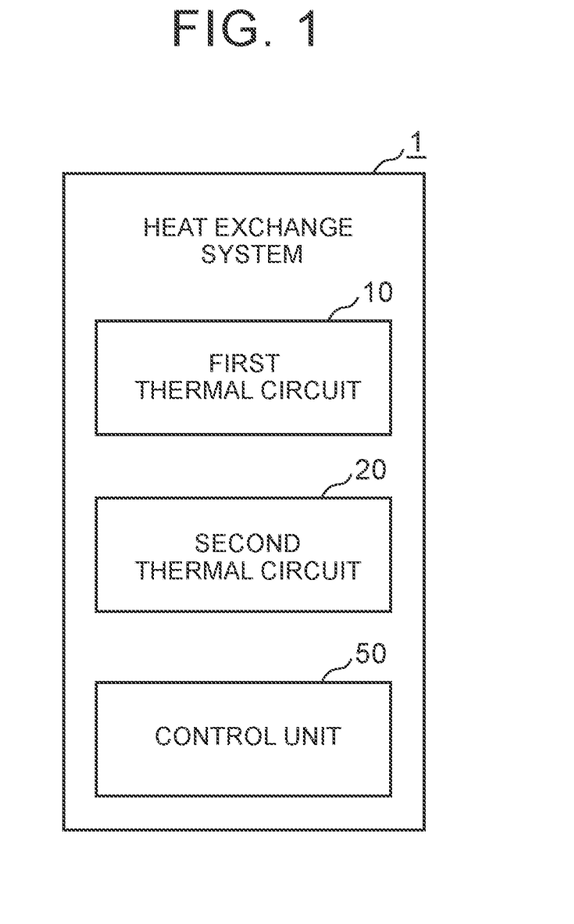
FIG. 1 is a functional block diagram showing a schematic configuration of a heat exchange system according to an embodiment.
Figure 2:
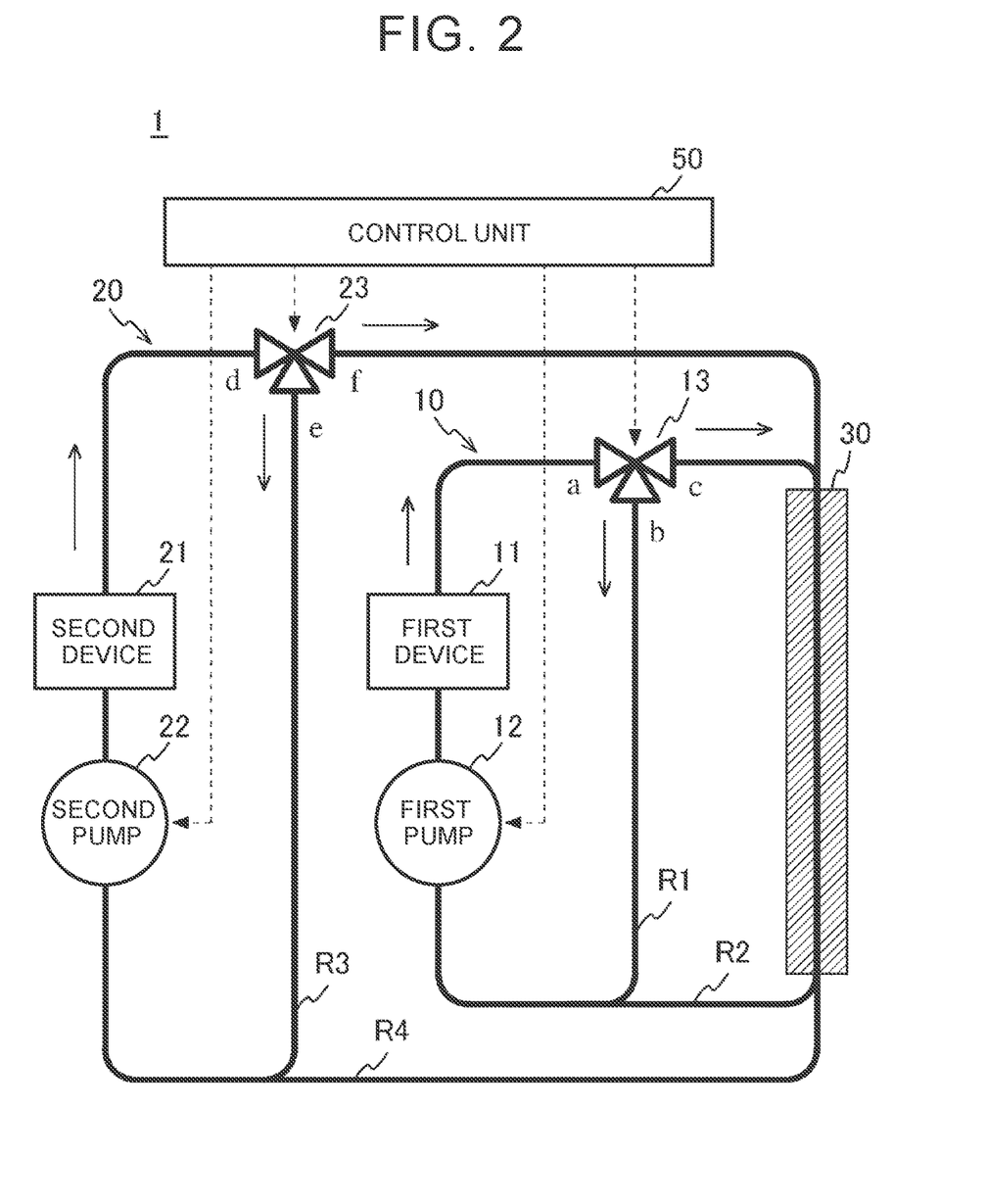
FIG. 2 is a diagram illustrating a detailed configuration of a first thermal circuit and a second thermal circuit

FIG. 1 is a functional block diagram showing a schematic configuration of a heat exchange system 1 according to an embodiment of the present disclosure. The heat exchange system 1 illustrated in FIG. 1 includes a first thermal circuit 10, a second thermal circuit 20, and a control unit 50. FIG. 2 is a diagram illustrating a detailed configuration of the first thermal circuit 10 and the second thermal circuit 20 shown in FIG. 1. The heat exchange system 1 can be mounted on a vehicle such as an automobile using an internal combustion engine as a power source or a hybrid vehicle (HV) using an electric motor as a power source.

The first thermal circuit 10 is a thermal circuit capable of heat exchange using a heat medium. The first thermal circuit 10 includes a first flow path R1, a second flow path R2, a first device 11, a first pump 12, and a first switching valve 13. The first device 11, the first pump 12, and the first switching valve 13 are connected with each other by the first flow path R1 and the second flow path R2 such that a first coolant (or refrigerant) that is a heat medium can be circulated.

The first device 11 is a device to be cooled using the first coolant circulating in the first flow path R1 or the second flow path R2. Examples of the first device 11 mounted on the vehicle include a battery, an electric motor, a chiller, and a water-cooled condenser.

The first pump 12 is a device that adjusts an amount of the first coolant to be pumped to the first flow path R1 or the second flow path R2 such that the coolant is circulated in the first flow path R1 or the second flow path R2. The control unit 50 issues a command on the amount of the first coolant to be pumped by the first pump 12 into the flow path.

The first switching valve 13 is a three-way valve for selectively switching which of the first flow path R1 and the second flow path R2 the first coolant pumped by the first pump 12 is circulated in. Specifically, the first switching valve 13 includes an inlet port a connected to the discharge side of the first pump 12, an outlet port b connected to the suction side of the first pump 12, and an outlet port c connected to a common flow path 30 that will be described later. The first flow path R1 is established by switching to a state where the inlet port a and the outlet port b communicate with each other, and the second flow path R2 is established by switching to a state where the inlet port a and the outlet port c communicate with each other. The control unit 50 controls the switching of the first switching valve 13. Further, a three-way valve of the related art may be used as the first switching valve 13.

The first flow path R1 and the second flow path R2 are flow paths through which the first coolant flows. The first switching valve 13 switches between the first flow path R1 and the second flow path R2. The first flow path R1 is a circulation flow path in which the first coolant pumped by the first pump 12 returns to the first pump 12 via the first device 11 and the first switching valve 13. The second flow path R2 is a circulation flow path in which the first coolant pumped by the first pump 12 returns to the first pump 12 via the first device 11, the first switching valve 13, and the common flow path 30. A part of the flow path to which the first device 11 and the first pump 12 are connected is shared between the first flow path R1 and the second flow path R2. Further, the second flow path R2 is longer (has a larger flow resistance) than the first flow path R1 because the second flow path R2 includes the common flow path 30.

The second thermal circuit 20 is a thermal circuit capable of heat exchange using a heat medium. The second thermal circuit 20 includes a third flow path R3, a fourth flow path R4, a second device 21, a second pump 22, and a second switching valve 23. The second device 21, the second pump 22, and the second switching valve 23 are connected with each other by the third flow path R3 and the fourth flow path R4 such that a second coolant (or refrigerant) that is a heat medium can be circulated. The second coolant may be the same substance as the first coolant.

The second device 21 is a device to be cooled using the second coolant circulating in the third flow path R3 or the fourth flow path R4. Examples of the second device 21 mounted on the vehicle include a battery, an electric motor, a chiller, and a water-cooled condenser.

The second pump 22 is a device that adjusts an amount of the second coolant to be pumped to the third flow path R3 or the fourth flow path R4 such that the coolant is circulated in the third flow path R3 or the fourth flow path R4. The control unit 50 issues a command on the amount of the second coolant to be pumped by the second pump 22 into the flow path.

The second switching valve 23 is a three-way valve for selectively switching which of the third flow path R3 and the fourth flow path R4 the second coolant pumped by the second pump 22 is circulated in. Specifically, the second switching valve 23 includes an inlet port d connected to the discharge side of the second pump 22, an outlet port e connected to the suction side of the second pump 22, and an outlet port f connected to the common flow path 30 that will be described later. The third flow path R3 is established by switching to a state where the inlet port d and the outlet port e communicate with each other, and the fourth flow path R4 is established by switching to a state where the inlet port d and the outlet port f communicate with each other. The control unit 50 controls the switching of the second switching valve 23. Further, a three-way valve of the related art may be used as the second switching valve 23.

The third flow path R3 and the fourth flow path R4 are flow paths through which the second coolant flows. The third flow path R3 and the fourth flow path R4 are switched by the second switching valve 23. The third flow path R3 is a circulation flow path in which the second coolant pumped by the second pump 22 returns to the second pump 22 via the second device 21 and the second switching valve 23. The fourth flow path R4 is a circulation flow path in which the second coolant pumped by the second pump 22 returns to the second pump 22 via the second device 21, the second switching valve 23, and the common flow path 30. A part of the flow path to which the second device 21 and the second pump 22 are connected is shared between the third flow path R3 and the fourth flow path R4. Further, the fourth flow path R4 is longer (has a larger flow resistance) than the third flow path R3 because the fourth flow path R4 includes the common flow path 30.

The common flow path 30 is a portion shared by the second flow path R2 of the first thermal circuit 10 and the fourth flow path R4 of the second thermal circuit 20. The common flow path 30 is provided at a location that is a part of the second flow path R2 through which the first coolant does not flow when the first flow path R1 is selected, and a part of the fourth flow path R4 in which the second coolant does not flow when the third flow path R3 is selected. An example of the common flow path 30 is a heat exchanger such as a radiator.

The control unit 50 controls each of switching of the first switching valve 13 of the first thermal circuit 10 and switching of the second switching valve 23 of the second thermal circuit 20. Further, the control unit 50 issues a command of the amount of the first coolant pumped by the first pump 12 of the first thermal circuit 10 to the first flow path R1 or the second flow path R2, and a command of the amount of the second coolant pumped by the second pump 22 of the second thermal circuit 20 to the third flow path R3 or the fourth flow path R4. The command for switching of the valve and the command for the pump executed by the control unit 50 will be described later.

The control unit 50 is typically configured as an electronic control unit (ECU) including a processor such as a microcomputer, a memory, and an input-output interface, and functions can be realized as the processor reads and executes a program stored in the memory.

Control

Flow path switching control executed by the heat exchange system 1 according to the embodiment will be described with reference to FIGS. 3 to 6C. The flow path switching control according to the embodiment is advantageous for switching a state where the flow path of one of the first thermal circuit 10 and the second thermal circuit 20 uses the common flow path 30 and the flow path of the other of the first thermal circuit 10 and the second thermal circuit 20 does not use the common flow path 30 to a state where the flow path of the one of the first thermal circuit 10 and the second thermal circuit 20 does not use the common flow path 30 and the flow path of the other of the first thermal circuit 10 and the second thermal circuit 20 uses the common flow path 30.

Figure 3:
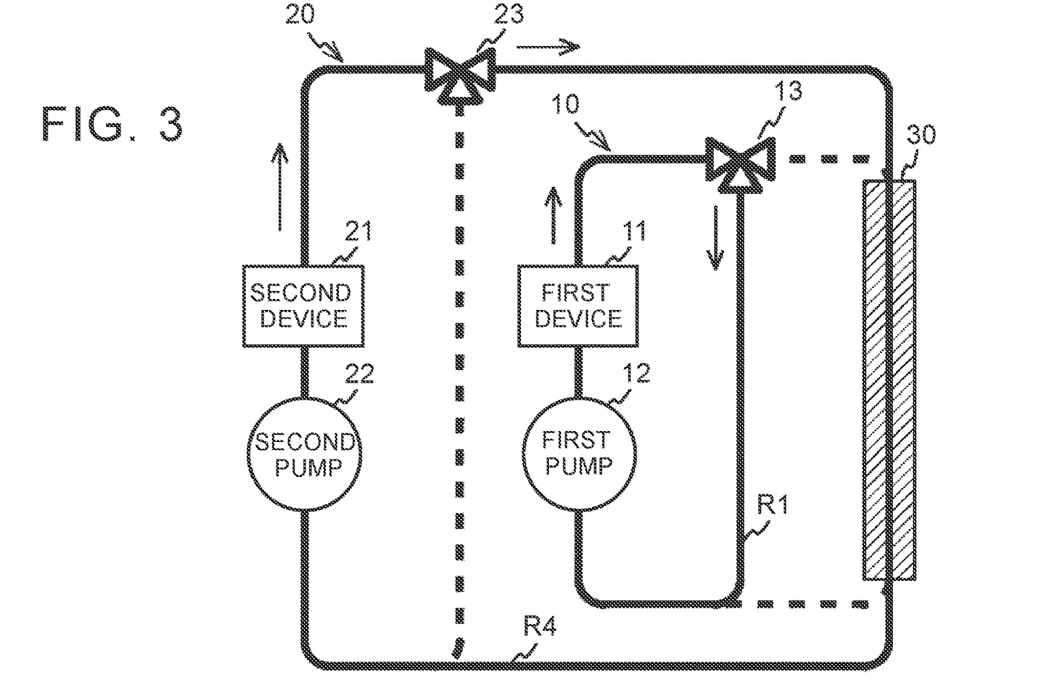
FIG. 3 is a diagram illustrating a flow path state of each thermal circuit before switching the flow path.
Figure 4:
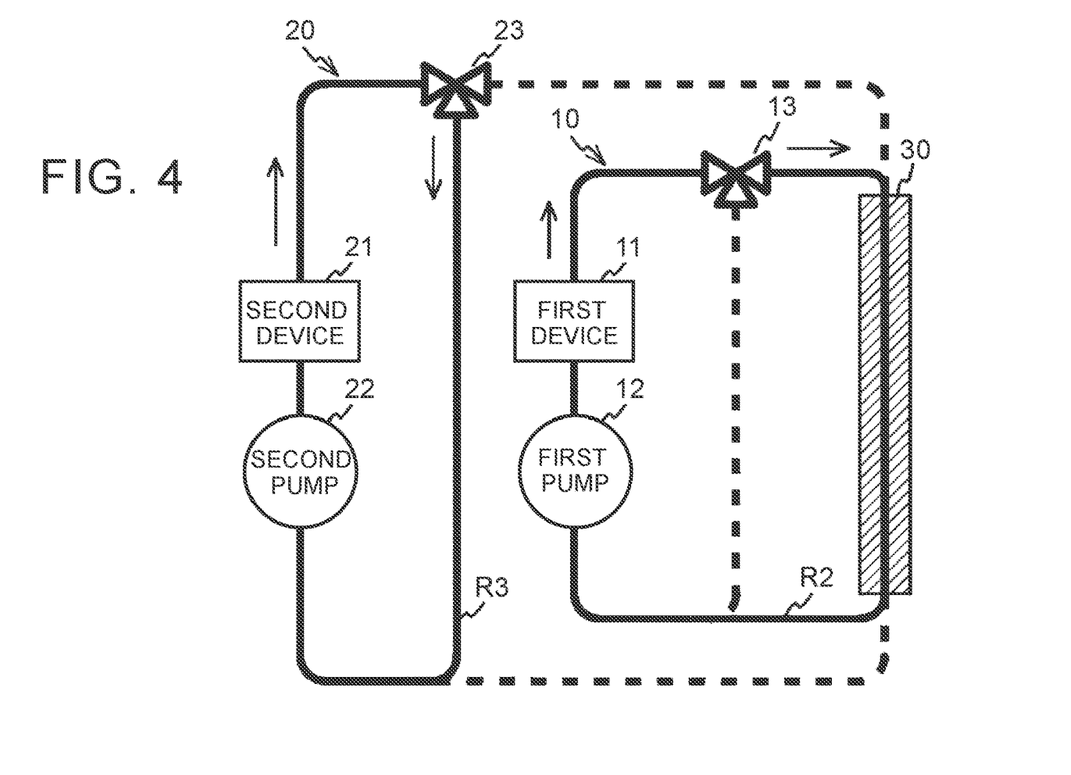
FIG. 4 is a diagram illustrating a flow path state of each thermal circuit after switching the flow path.

In the following example, the case where the state of the flow paths of the first thermal circuit 10 and the second thermal circuit 20 before switching the flow paths is the state of the first flow path R1 and the fourth flow path R4 shown in FIG. 3, and the state of the flow paths of the first thermal circuit 10 and the second thermal circuit 20 after switching the flow paths is the state of the second flow path R2 and the third flow path R3 shown in FIG. 4 will be described.

Figure 5:
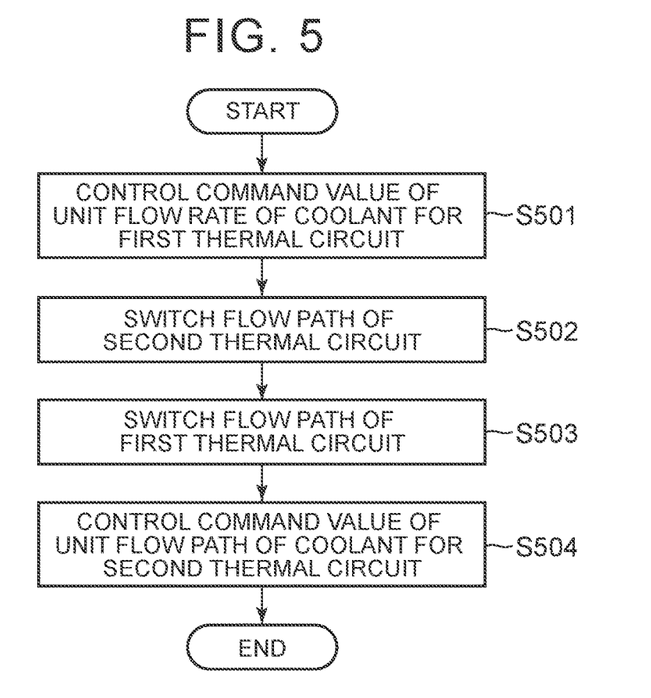
FIG. 5 is a flowchart showing a processing procedure of flow path switching control executed by a control unit of the heat exchange system.
Figure 6A:
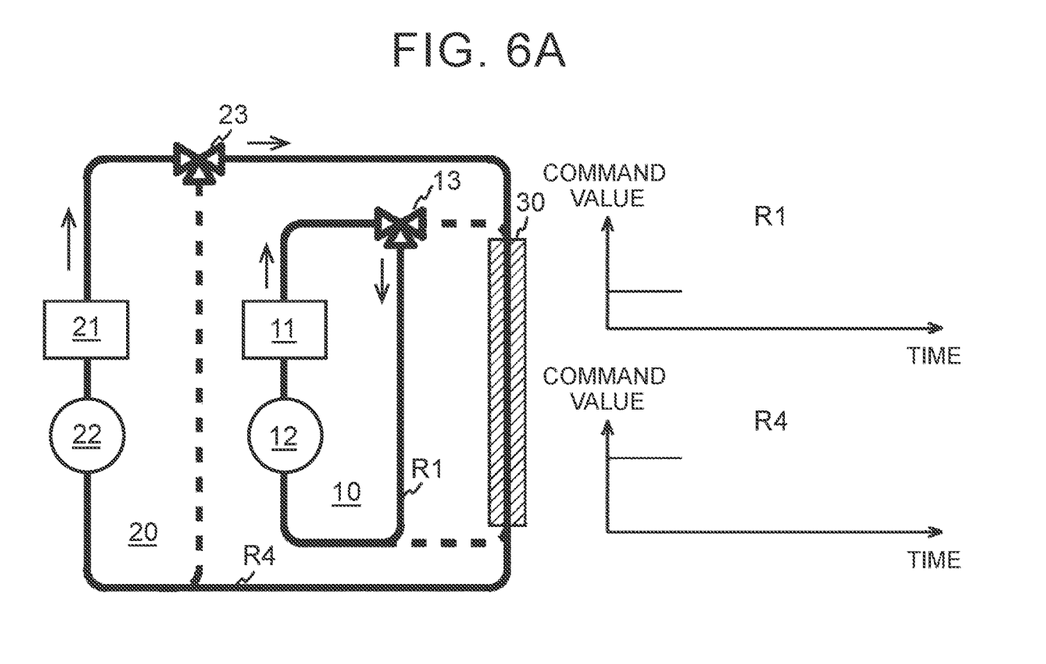
FIG. 6A is a diagram illustrating a procedure for switching a flow path state of each thermal circuit.
Figure 6B:
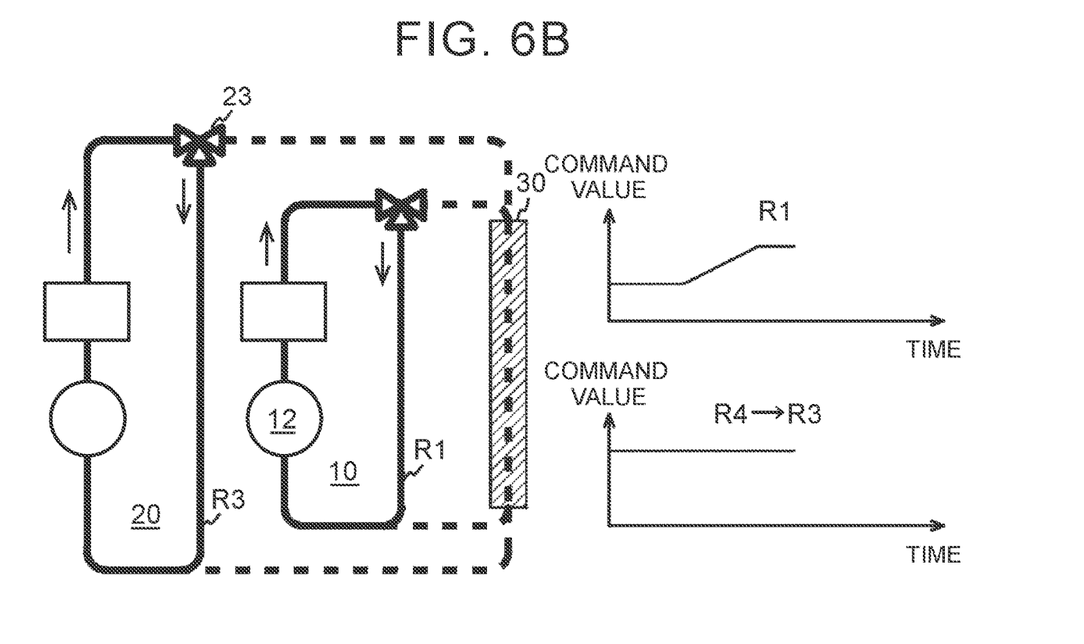
FIG. 6B is a diagram illustrating a procedure for switching a flow path state of each thermal circuit.
Figure 6C:
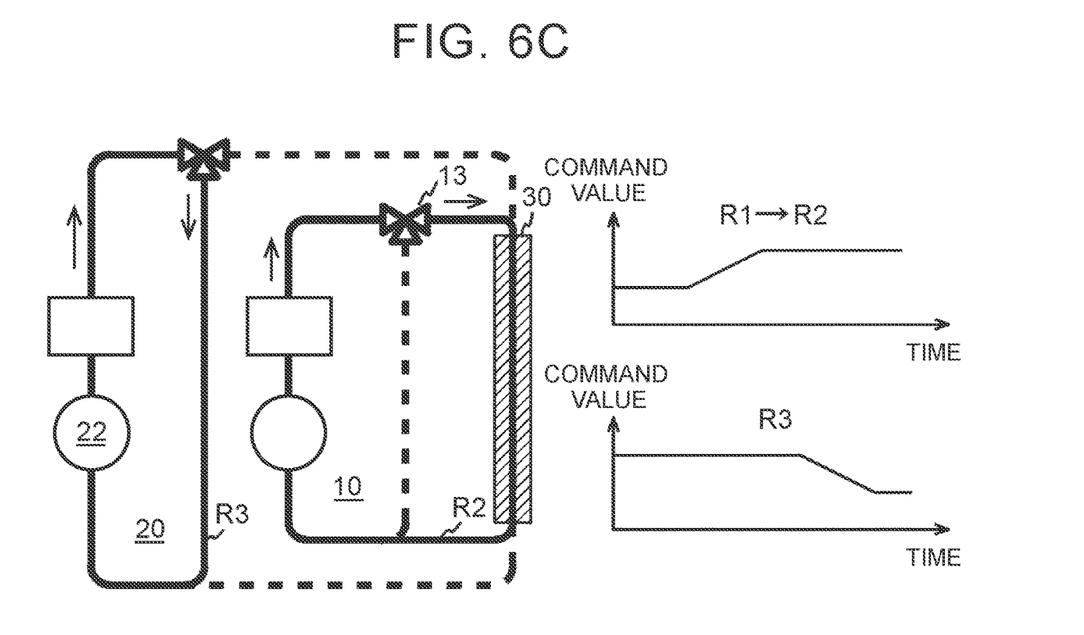
FIG. 6C is a diagram illustrating a procedure for switching a flow path state of each thermal circuit.

FIG. 5 is a flowchart showing a processing procedure of the flow path switching control executed by the control unit 50 of the heat exchange system 1. FIGS. 6A to 6C are diagrams for describing a procedure to switch the flow path state (the first flow path R1 and the fourth flow path R4) shown in FIG. 3 to the flow path state (the second flow path R2 and the third flow path R3) shown in FIG. 4.

In the state before the flow paths are switched (FIG. 3 and the left diagram of FIG. 6A), a command value of a unit flow rate (the upper right chart in FIG. 6A) that is a flow rate per unit time of the flow path of the first coolant in the first flow path R1 with respect to the first pump 12 of the first thermal circuit 10 and a command value of a unit flow rate (the lower right chart in FIG. 6A) that is a flow rate per unit time of the flow path of the second coolant in the fourth flow path R4 with respect to the second pump 22 of the second thermal circuit 20 are stable at constant values. From the state above, the control unit 50 switches the flow paths in the following procedure.

Step S501: The control unit 50 of the heat exchange system 1 controls the command value of the unit flow rate of the first coolant in the first thermal circuit 10, which is a thermal circuit that does not use the common flow path 30. Specifically, the second flow path R2 after the switching is longer than the first flow path R1 before the switching, and the flow resistance thus increases in the second flow path R2. Therefore, the control unit 50 issues a command to the first pump 12 of the first thermal circuit 10 to increase the amount of the first coolant pumped to the first flow path R1. With the command above, the command value of the unit flow rate of the first coolant in the first flow path R1 is controlled to increase (the upper right chart in FIG. 6B). The command above is issued so as to avoid that the unit flow rate of the first coolant in the second flow path R2 after switching of the flow path in the first thermal circuit 10 from the first flow path R1 to the second flow path R2 is reduced to fall below a predetermined reference value even when the flow path through which the first coolant circulates becomes longer and the flow resistance is accordingly increased. It is desirable to make the unit flow rate of the first coolant constant as a result of changing the command value of the unit flow rate of the first coolant for the first pump 12 in accordance with a fluctuation of the flow resistance that occurs in accordance with the length of the flow path through which the first coolant circulates. Therefore, the reference value above is typically the unit flow rate of the first coolant in the first flow path R1 before the command is issued to the first pump 12 for increasing the amount of the first coolant pumped by the first pump 12. However, the reference value may be the unit flow rate of the first coolant required to cool the first device 11.

The command for the first pump 12 to increase the amount of the first coolant to be pumped can be issued by making a correction with multiplying the current command value for the first pump 12 by a predetermined coefficient (=1 or more) or by adding a predetermined correction value to the current command value for the first pump 12. The coefficient and the correction amount can be derived based on a difference in length or a difference in flow resistance between the first flow path R1 and the second flow path R2, etc.

Step S502: The control unit 50 of the heat exchange system 1 switches the flow path of the second thermal circuit 20, which is a thermal circuit using the common flow path 30. Specifically, the control unit 50 controls the second switching valve 23 of the second thermal circuit 20 to switch the flow path of the second thermal circuit 20 from the fourth flow path R4 to the third flow path R3 (the left diagram in FIG. 6B). With the switching (from the fourth flow path R4 to the third flow path R3) above, the command value of the unit flow rate of the second coolant for the second pump 22 is the same, but the flow path through which the second coolant of the second thermal circuit 20 circulates becomes shorter and the flow resistance is thus reduced. Therefore, the unit flow rate of the second coolant in the third flow path R3 temporarily increases. Further, with the switching above, the common flow path 30 is not used by either the first thermal circuit 10 or the second thermal circuit 20 and is in a separated state (the left diagram in FIG. 6B).

The processing in step S501 and the processing in step S502 described above are typically executed in parallel. However, the processing in step S501 may be executed first and then the processing in step S502 may be executed, or the processing in step S502 may be executed first and then the processing in step S501 may be executed.

Step S503: The control unit 50 of the heat exchange system 1 switches the flow path of the first thermal circuit 10. Specifically, the control unit 50 controls the first switching valve 13 of the first thermal circuit 10 to switch the flow path of the first thermal circuit 10 from the first flow path R1 to the second flow path R2 (the left diagram in FIG. 6C). With the switching (from the first flow path R1 to the second flow path R2) above, the flow path through which the first coolant of the first thermal circuit 10 circulates becomes longer and the flow resistance thus increases. Therefore, the unit flow rate of the first coolant in the second flow path R2 fluctuates in a decreasing direction. Here, the command value of the unit flow rate of the first coolant for the first pump 12 is increased in advance in step S501. Therefore, even when the flow path through which the first coolant circulates becomes longer and the flow resistance thus increases due to the switching of the flow path, the resultant unit flow rate of the first coolant in the second flow path R2 can be made constant. Therefore, the unit flow rate required for cooling the first device 11 can be stably secured.

Step S504: The control unit 50 of the heat exchange system 1 controls the command value of the unit flow rate of the second coolant in the second thermal circuit 20. Specifically, the control unit 50 commands the second pump 22 of the second thermal circuit 20 to reduce the amount of the second coolant pumped to the third flow path R3. With the command above, the command value of the unit flow rate of the second coolant in the third flow path R3 decreases (the lower right diagram of FIG. 6C). The command above is issued such that the unit flow rate of the second coolant in the third flow path R3 after switching of the flow path in the second thermal circuit 20 from the fourth flow path R4 to the third flow path R3 becomes substantially equivalent to the unit flow rate of the second coolant in the fourth flow path R4 before the switching even when the flow path through which the second coolant circulates becomes shorter and the flow resistance thus decreases.

The command for the second pump 22 to reduce the amount of the second coolant to be pumped by the second pump 22 can be issued by making a correction with multiplying the current command value for the second pump 22 by a predetermined coefficient (=less than 1) or by subtracting a predetermined correction value from the current command value for the second pump 22. The coefficient and the correction amount can be derived based on a difference in length and a difference in flow resistance between the third flow path R3 and the fourth flow path R4, etc.

The processing in step S503 and the processing in step S504 described above are typically executed in parallel. However, the processing in step S503 may be executed first and then the processing in step S504 may be executed, or the processing in step S504 may be executed first and then the processing in step S503 may be executed.

Further, the processing in step S501 and the processing in step S504 above may be omitted when the unit flow rate of the coolant does not change significantly before and after the switching of the flow path (there is no significant difference in the length of the circulation flow path).

When the unit flow rate of the first coolant in the second flow path R2 after the switching of the flow path becomes substantially equivalent to the unit flow rate of the first coolant in the first flow path R1 before the switching of the flow path, and the unit flow rate of the second coolant in the third flow path R3 after the switching of the flow path becomes substantially equivalent to the unit flow rate of the second coolant in the fourth flow path R4 before the switching of the flow path, this routine of the flow path switching control is terminated.

The flow path switching control described above can be executed in the procedure similar to the above even when a state where the flow path of the first thermal circuit 10 is the second flow path R2 and the flow path of the second thermal circuit 20 is the third flow path R3 is switched to a state where the flow path of the first thermal circuit 10 is the first flow path R1 and the flow path of the second thermal circuit 20 is the fourth flow path R4.

Application Example

Figure 7:
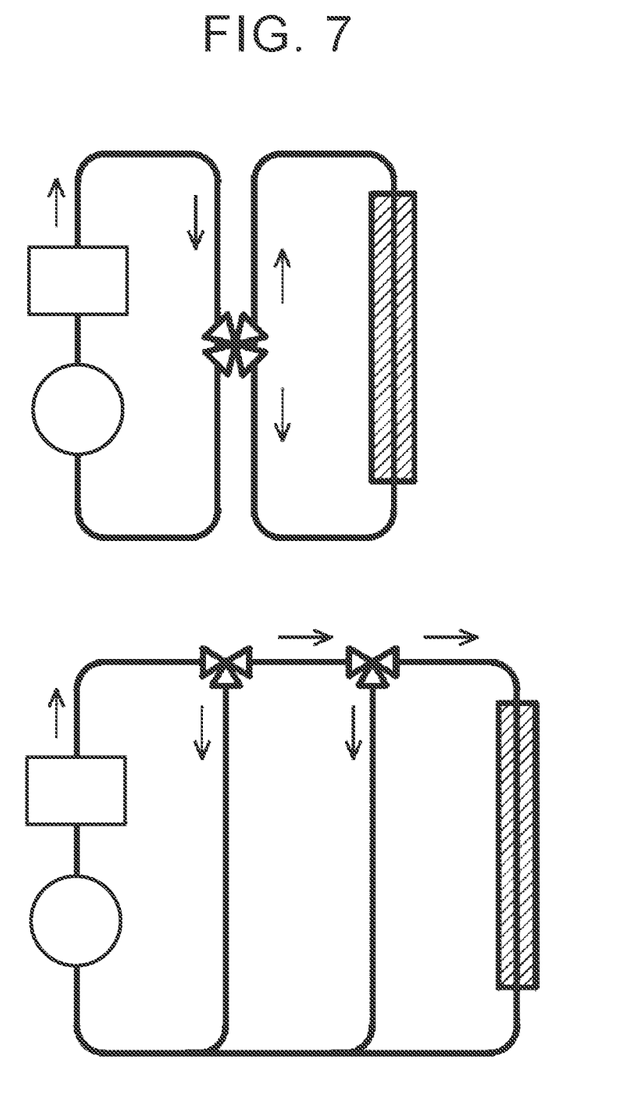
FIG. 7 is an application example of a configuration of a thermal circuit.

The configuration of the thermal circuit to which the flow path switching control of the present disclosure can be applied is not limited to the configuration of the first thermal circuit 10 and the second thermal circuit 20 shown in the drawings. When the thermal circuit is a thermal circuit having a configuration in which a plurality of flow paths is switchable and at least one of the flow paths serves as a circulation flow path including a common flow path that is shared by a plurality of the thermal circuits, and at least another one of the flow paths serves as a circulation flow path not including the common flow path, the flow path switching control of the present disclosure can be applied. For example, thermal circuits having the configurations shown in FIG. 7 can be used.

Figure 8:
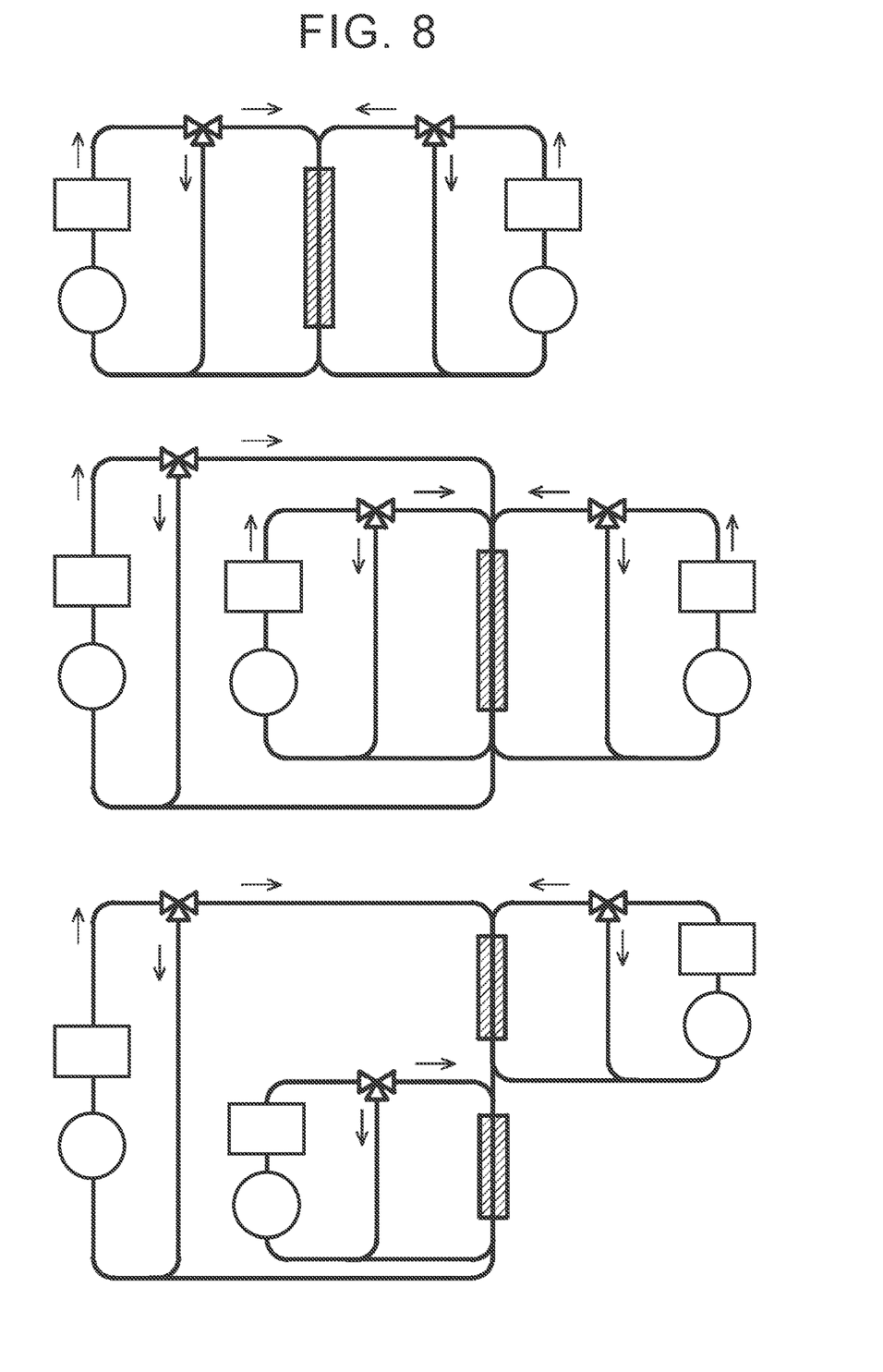
FIG. 8 is an application example of a connection mode of thermal circuits.

Further, a connection mode of the thermal circuit to which the flow path switching control of the present disclosure can be applied is not limited to the connection mode of the first thermal circuit 10 and the second thermal circuit 20 shown in the drawings. The flow path switching control of the present disclosure can be applied to any connection mode in which one common flow path is shared by two or more thermal circuits among the plurality of thermal circuits. For example, connection modes of the thermal circuits as shown in FIG. 8 can be used.

Operations and Effects

As described above, the heat exchange system 1 according to the embodiment of the present disclosure includes the first thermal circuit 10 and the second thermal circuit 20. The first thermal circuit 10 includes the first flow path R1 that circulates the first coolant to cool the first device 11 and the second flow path R2 that circulates the first coolant via the common flow path 30 to cool the first device 11. The second thermal circuit 20 includes the third flow path R3 that circulates the second coolant to cool the second device 21 and the fourth flow path R4 that circulates the second coolant via the common flow path 30 to cool the second device 21. In the heat exchange system 1, when switching the flow path of the first thermal circuit 10 from the first flow path R1 to the second flow path R2 and switching the flow path of the second thermal circuit 20 from the fourth flow path R4 to the third flow path R3, the control to switch the fourth flow path R4 to the third flow path R3 first and then switch the first flow path R1 to the second flow path R2 is executed.

With the flow path switching control above, when switching from the state where the coolant flows through the common flow path 30 in one of the thermal circuits to the state where the coolant flows through the common flow path 30 in the other of the thermal circuits, the flow path of either of the thermal circuits is switched after the separated state where the coolant does not flow through the common flow path 30. Therefore, occurrence of unintended fluctuations in the flow rate that causes circulation of the coolant in the flow path to stop and the coolant in the flow path to flow in a reverse direction can be suppressed because the coolant in the flow path in one of the thermal circuit is suppressed from temporarily merging into the coolant in the flow path of the other of the thermal circuits in the common flow path 30.

Further, in the heat exchange system 1 according to the embodiment, in each thermal circuit, the command value of the unit flow rate of the coolant pumped by the pump to the flow path is increased in advance before the flow path is switched when the flow path after the switching is longer than the flow path before the switching. With the control above, when switching from a short flow path to a long flow path, falling of the unit flow rate of the coolant below the unit flow rate required for cooling the device can be avoided. Therefore, deterioration of performance to cool the device can be suppressed. Further, the unit flow rate of the coolant does not decrease during the switching of the flow path. Therefore, other controls, such as pump flow rate compensation control, can be executed.

As described above, the heat exchange system 1 according to the embodiment executes the cooperative control by switching the flow paths of the thermal circuits and adjusting the unit flow rate of the coolant in the flow path, thereby suppressing occurrence of parts damage and output limitation due to insufficient cooling of the device while avoiding occurrence of unintended fluctuations in the flow rate in the thermal circuits.

Although one embodiment of the technique of the present disclosure has been described above, the present disclosure can be interpreted as a flow path switching control method executed by a control unit including a processor and a memory, a control program of the method, a computer-readable, non-transitory storage medium that stores the control program, or a vehicle on which the heat exchange system including the control unit is mounted, for example, in addition to the heat exchange system.

The present disclosure can be used as a heat exchange system that executes heat exchange of devices mounted on a vehicle.

What is claimed is:
1. A heat exchange system, comprising:
a thermal circuit including
a device,
a pump,
a first flow path configured to circulate coolant pumped by the pump to cool the device, and
a second flow path configured to circulate the coolant to cool the device,
wherein the first flow path has lower flow resistance than the second flow path; and
a controller configured to switch from the first flow path to the second flow path after issuing a command to increase an amount of the coolant pumped by the pump to the first flow path.

2. The heat exchange system according to claim 1, wherein:
the second flow path is longer than the first flow path;
the amount of the coolant pumped by the pump to the first flow path is increased such that a unit flow rate of the coolant in the second flow path after switching from the first flow path to the second flow path does not fall below a predetermined reference value; and the predetermined reference value is a unit flow rate of the coolant in the first flow path before issuing the command to increase the amount of the coolant pumped by the pump to the first flow path.

3. A flow path switching control method executed by a computer of a heat exchange system including a thermal circuit having a device, a pump, a first flow path configured to circulate coolant pumped by the pump to cool the device, and a second flow path configured to circulate the coolant to cool the device, wherein the first flow path has lower flow resistance than the second flow path, the method comprising:

changing an amount of the coolant pumped by the pump, and switching from the first flow path to the second flow path after the amount of the coolant pumped by the pump to the first flow path is increased.

4. The method according to claim 3, wherein:

the second flow path is longer than the first flow path;

the amount of the coolant pumped by the pump to the first flow path is increased such that a unit flow rate of the coolant in the second flow path after switching from the first flow path to the second flow path does not fall below a predetermined reference value; and the predetermined reference value is a unit flow rate of the coolant in the first flow path before the amount of the coolant pumped by the pump to the first flow path is increased.

5. A vehicle comprising:

a heat exchange system with a thermal circuit including a device, a pump, a first flow path configured to circulate coolant pumped by the pump to cool the device, and a second flow path with a heat exchanger and configured to circulate the coolant to cool the device, wherein the first flow path has lower flow resistance than the second flow path; and a controller configured to switch from the first flow path to the second flow path after issuing a command to increase an amount of the coolant pumped by the pump to the first flow path.

6. The vehicle according to claim 5, wherein:

the second flow path is longer than the first flow path;

the amount of the coolant pumped by the pump to the first flow path is increased such that a unit flow rate of the coolant in the second flow path after switching from the first flow path to the second flow path does not fall below a predetermined reference value; and the predetermined reference value is a unit flow rate of the coolant in the first flow path before issuing the command to increase the amount of the coolant pumped by the pump to the first flow path.

* * * * *